United States Patent
Buonanno et al.

(10) Patent No.: US 7,499,972 B1
(45) Date of Patent: Mar. 3, 2009

(54) B2B SERVICE CENTER COMMUNICATIONS USING LOCATE COLLABORATE TRANSACT METHODOLOGY

(75) Inventors: Mark Buonanno, Sunnyvale, CA (US); Michael Swailes, Pleasanton, CA (US); Jean Seo, Union City, CA (US)

(73) Assignee: Cisco Technology Inc., San Jose, CA (US)

( * ) Notice: Subject to any disclaimer, the term of this patent is extended or adjusted under 35 U.S.C. 154(b) by 247 days.

(21) Appl. No.: 09/839,975

(22) Filed: Apr. 20, 2001

(51) Int. Cl.
*G06F 15/16* (2006.01)
*G06F 3/00* (2006.01)
*H04M 7/00* (2006.01)
*G06Q 10/00* (2006.01)

(52) U.S. Cl. .................. 709/204; 715/753; 715/751; 379/221.12; 705/1

(58) Field of Classification Search .............. 705/1, 705/5, 6, 7, 8, 9, 10, 11, 12, 14, 21, 26, 27, 705/34, 37, 40, 80, 400, 16, 39; 709/223, 709/202, 204; 379/221.08, 201.01, 221.12; 370/260, 261, 262; 455/416; 715/751, 753
See application file for complete search history.

(56) References Cited

U.S. PATENT DOCUMENTS

| | | |
|---|---|---|
| 4,554,418 A | 11/1985 | Toy |
| 4,899,375 A | 2/1990 | Bauer et al. |
| 5,043,983 A | 8/1991 | Dorst et al. |
| 5,287,505 A | 2/1994 | Calvert et al. |
| 5,414,754 A | 5/1995 | Pugh et al. |
| 5,822,410 A | 10/1998 | McCausland et al. |
| 5,983,198 A | 11/1999 | Mowery et al. |
| 6,012,045 A | 1/2000 | Barzilai et al. |
| 6,029,140 A | 2/2000 | Martin et al. |
| 6,032,184 A * | 2/2000 | Cogger et al. .......... 705/8 |
| 6,182,277 B1 | 1/2001 | DeGroot et al. |

(Continued)

FOREIGN PATENT DOCUMENTS

WO  9903053  1/1991

(Continued)

OTHER PUBLICATIONS

Look Smart; Find Articles: AT&T, MCI to Release New Management Tools; Jan. 1994; 3 pages.

*Primary Examiner*—Igor N Borissov
(74) *Attorney, Agent, or Firm*—Stolowitz Ford Cowger LLP

(57) ABSTRACT

An apparatus and method for providing a locate, collaborate, and transact (LCT) communications platform for a business-to-business exchange service center. The LCT communications platform enables the needed human communications between buyers and sellers to take place within a virtual marketplace as a fully integrated software communication platform within a B2B exchange environment. The LCT communications platform comprises call center technology, web collaboration technology, and unified communication technology. The integration of these three technologies integrates human communications into high value business transactions that require quick resolution of opportunity or exception handling (e.g., links workflow with the exchange service center); develops an proactive role for service centers that can put the right people together at the right time to do real-time secure business; cuts the cycle time to complete business by engaging customer collaboration; and enhances the B2B exchanges role to provide either human collaboration service or provide the platform for business ready business to supplier direct communication.

13 Claims, 4 Drawing Sheets

U.S. PATENT DOCUMENTS

| | | | |
|---|---|---|---|
| 6,289,333 B1 | 9/2001 | Jawahar et al. | |
| 6,328,207 B1 | 12/2001 | Gregoire | |
| 6,363,411 B1* | 3/2002 | Dugan et al. | 709/202 |
| 6,418,461 B1* | 7/2002 | Barnhouse et al. | 709/201 |
| 6,438,599 B1* | 8/2002 | Chack | 709/229 |
| 6,530,518 B1 | 3/2003 | Krichilsky et al. | |
| 6,606,744 B1 | 8/2003 | Mikurak | |
| 6,779,030 B1* | 8/2004 | Dugan et al. | 709/223 |
| 6,957,186 B1 | 10/2005 | Guheen et al. | |
| 2001/0032263 A1 | 10/2001 | Gopal et al. | |
| 2001/0044840 A1 | 11/2001 | Carleton | |
| 2001/0051878 A1* | 12/2001 | Yong | 705/1 |
| 2002/0049622 A1 | 4/2002 | Lettich et al. | |
| 2002/0059131 A1* | 5/2002 | Goodwin et al. | 705/37 |
| 2002/0071440 A1* | 6/2002 | Cerami et al. | 370/404 |
| 2002/0072992 A1* | 6/2002 | Elms et al. | 705/26 |
| 2002/0073355 A1 | 6/2002 | Cerami et al. | |
| 2002/0078017 A1 | 6/2002 | Cerami et al. | |
| 2002/0087680 A1* | 7/2002 | Cerami et al. | 709/224 |
| 2002/0138320 A1 | 9/2002 | Robertson et al. | |
| 2002/0169626 A1* | 11/2002 | Walker et al. | 705/1 |
| 2002/0188530 A1 | 12/2002 | Wojcik et al. | |
| 2002/0194272 A1 | 12/2002 | Zhu | |
| 2003/0177071 A1* | 9/2003 | Treese et al. | 705/26 |
| 2004/0049562 A1 | 3/2004 | Kikinis | |
| 2005/0021713 A1* | 1/2005 | Dugan et al. | 709/223 |

FOREIGN PATENT DOCUMENTS

WO    WO 9903053  *  1/1999

* cited by examiner

B2B SERVICE CENTER COMMUNICATIONS USING LOCATE COLLABORATE TRANSACT METHODOLOGY

FIELD OF THE INVENTION

The present invention relates to an apparatus and method for providing a locate, collaborate, and transact communications platform for a business-to-business exchange service center.

BACKGROUND OF THE INVENTION

Currently, the business-to-business (B2B) market is exploding. The primary attraction and allure of B2B lies in its potential for enabling a large number of highly automated low-cost transactions to be conducted on a regular basis with multiple trading partners. Ideally, the B2B model attempts to eliminate any form of human interaction in order to reduce costs while, at the same time, increasing the speed and efficiency of executing transactions.

Although the B2B approach appears to address many of the problems inherent to conducting business, there still remain several issues which need to be resolved for B2B to truly excel. One problem is that current markets only offer limited liquidity. The current market place today usually gives buyers and sellers limited capabilities. Buyers and sellers have limited access to each other, typically contingent upon what resources are available to explore marketplace options. If machine transactions do occur, this only happens among the largest companies with established business relationships. Thus, by the nature of the structure of today's B2B technology, buyers and sellers are limited to fully explore efficient market transaction choices.

Another problem is that current B2B exchanges do not have an integrated communications solution to utilize human decision making. The supply chain velocity today is often hindered by poor communication between buyers and sellers. Little to no focus has been paid to human intervention automation. In the past, human elimination was the goal. However, in actuality, buying agents and procurement engineers spend most of their day trying to reach individuals. Furthermore, before a transaction is executed, buyers and sellers work to negotiate their own criteria for a purchase/sale. However, current B2B exchanges do not offer a method to complete this critical business process of matching the criteria of buyers and sellers within an exchange setting.

Furthermore, markets often experience supply shortages or excesses. The potential for extreme volatility in the market (in terms such as price, quantity, delivery date, etc.) exists and poses an inherent risk. Again, this risk is exacerbated by poor communication between buyers and suppliers, or by a poor view of the market to truly determine an effective purchasing/sale strategy. These disadvantages contribute real market inefficiencies and costly purchasing mistakes.

Yet another drawback is that there typically is no mechanism for market participants to develop deeper business relations within today's B2B exchange setting. While exchanges are excellent methods to match buyers and suppliers together, such structures currently have no way to enable both parties to develop a deeper business relationship with each other. The process towards executing an agreement may be long and complex. As these matches occur within the setting of a B2B exchange, the ability to develop a better understanding of each other's requirements becomes curtailed without a way to enable both parties to communicate effectively with each other. Thus, once buyers and suppliers have found each other, there is no ready way to pull away from the exchange to better understand each other's terms and conditions for a longer lasting business relationship.

SUMMARY OF THE INVENTION

The present invention pertains to an apparatus and method for providing a locate, collaborate, and transact (LCT) communications platform for a business-to-business exchange service center. The LCT communications platform enables the needed human communications between buyers and sellers to take place within a virtual marketplace as a fully integrated software communication platform within a B2B exchange environment. The LCT communications platform comprises call center technology, web collaboration technology, and unified communication technology. The integration of these three technologies integrates human communications into high value business transactions that require quick resolution of opportunity or exception handling (e.g., links workflow with the exchange service center); develops an proactive role for service centers that can put the right people together at the right time to do real-time secure business; cuts the cycle time to complete business by engaging customer collaboration; and enhances the B2B exchanges role to provide either human collaboration service or provide the platform for business ready business to supplier direct communication.

In one embodiment of the present invention, video conferencing, web meeting, instant messaging, and internet collaboration are all features integrated within the software communication platform and which are available to the purchasers and buyers utilizing that eMarketplace. In addition, internet collaboration such as page sharing, follow-me, form share, text chat, application demonstrations, application sharing, whiteboarding, and seek-and-find features are also integrated as part of the LCT communications platform. Furthermore, the LCT communications platform includes the capability of requesting the aid of a proactive call center agent to help complete a transaction. Alternatively, the proactive call center agent can initialize dialog between interested parties if certain pre-selected criteria for a prospective transaction are met. Additional features which may be integrated within the LCT communications platform include seek-and-find technology, instant messaging, continuous call recording, and transaction signature.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for providing a locate, collaborate, and transact (LCT) communications platform for a business-to-business exchange service center is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
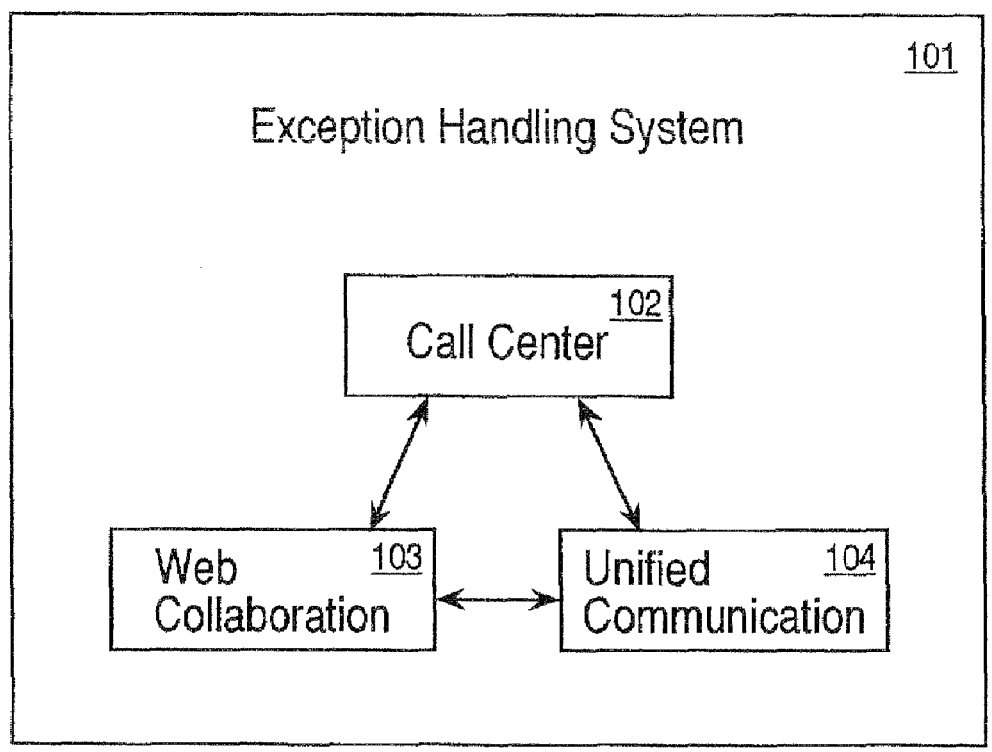
FIG. 1 shows an exemplary LCT communications platform.

In the present invention, the LCT communications platform enables the needed human communications between buyers and sellers to take place within a virtual marketplace as a fully integrated software communication platform within a B2B exchange environment. FIG. 1 shows an exemplary LCT communications platform 101 comprising call center technology 102, web collaboration technology 103, and unified communication technology 104. The integration of these three technologies integrates human communications into high value business transactions that require quick resolution of opportunity or exception handling (e.g., links workflow with the exchange service center); develops an proactive role for service centers that can put the right people together at the right time to do real-time secure business; cuts the cycle time to complete business by engaging customer collaboration; and enhances the B2B exchanges role to provide either human collaboration service or provide the platform for business ready business to supplier direct communication. The LCT communications platform 101 allows for four main types of options for customers to execute a transaction within an exchange:

1. Automatic machine-to-machine transactions once buyer/seller criteria is met.
2. Manual transactions between buyer/seller through the available communications platform.
3. Call center agent facilitates a transaction when invited by a buyer and seller from a preset criteria. These communications links to the exchange finally act to execute a transaction once terms and conditions of a sale are settled.
4. Monitored non-transactional collaboration can occur between buyer, supplier, and agent but may later (or still not become) a transaction.

In one embodiment, the present invention resolves the issue of limited liquidity by using the eMarketplace exchange to create a liquidity of Buyers and Sellers by congregating all market participants into a vertical exchange for a particular product. The exchange aggregates enough buyers and suppliers to the exchange to generate transaction-based revenue. To facilitate this liquidity further, the LCT technology integrates the eMarketplace exchange with a communications platform utilizing the latest Internet technologies available today to "locate" participants. The communication platform includes the integration and use of video conferencing, web meeting, instant messaging, and Internet collaboration such as page sharing, follow-me, form share, text chat, application demonstrations, application sharing, whiteboarding, and seek-and-find software. These are all technologies described in the patent application entitled, "Multimedia B2B Opportunity and Error Detection and Resolution Engine," Ser. No. 09/727,841, filed Nov. 30, 2000 and in the patent application entitled, "Proactive Call and Contact Center," Ser. No. 09/766,175, filed Jan. 18, 2001, both of which are incorporated by reference in their entirety herewith.

Furthermore, the LCT invention provides a method to complete the critical business process of matching the criteria of buyers and sellers within an exchange setting. This is accomplished by giving buyers and sellers direct access to each other via a wide array of communications tools. These tools solve communication problems by linking buyers and sellers directly to each other while being linked to the exchange. Thus, market participants are enabled to collaborate with each other. Market participants have the tools to collaborate within a B2B exchange setting through several options. They can either interact with each other via the tools offered in the communications platform, ask for assistance, or be automatically assisted by a Proactive Call Center agent.

In addition, the present LCT invention solves the problems posed by unfulfilled orders or excessive supply. By integrating the Proactive Call Center technology with the collaborative communications tools in an exchange, buyers or sellers can set predetermined criteria for a purchase or sale of goods. However, since market volatility can occur very quickly, the preset criteria does not necessarily translate into an immediate execution of a transaction. Buyers and suppliers have the option of being contacted by a Proactive Call Center agent before finalizing a transaction. Call center agents can immediately contact buyers and suppliers about the potential of a pending transaction utilizing the seek-and-find by locating through cellular phone or instant messaging. Call center agents can provide the latest market information due to the massive liquidity in the vertical exchange. Based upon the latest information, buyers and suppliers can then choose to act upon what is available in the market or choose to pass on the opportunity.

This third-party agent helps to ensure that the collaboration continues until all criteria are met for both buyer and seller. Once parties are ready to make a transaction, both parties connect into the exchange via the communication platform to execute the transaction. The integration includes IP phone authentication and authorization of business transactions. The process integrates the web collaboration call center technology and a dynamic content adapter. Examples of web collaboration technology as may be practiced by the present invention are disclosed in the patent applications entitled, "Copy Server For Collaboration And Electronic Commerce," filed Jul. 6, 1999, Ser. No. 09/347,870 and "Method And Apparatus For Providing Shared Access To An Application," filed Nov. 23, 1999, Ser. No. 60/167,551, both of which are assigned to the assignee of the present invention and which are incorporated by reference in their entirety herein. Thereby, when market participants have fully agreed to each other's terms of purchase, they can finally "Transact." This is also known as collaborative commerce.

In the present invention, the buyer and supplier can utilize the communication services and transaction capabilities of an exchange without requiring an intermediary person from a service center. Many of the valued services would still be available, for example, continuous call recording, transaction signature, and self help collaboration fro the suppliers and buyers. This feature allows exchanges to be a place to get something done quickly and not as an intermediary provider trying to charge a percentage of the transaction revenue. This feature incorporates a communication screen with all capable self-collaboration tools; Internet meeting with PowerPoint presentation capability; videoconference; web collaboration tools (e.g., page sharing, white-boarding, etc.). Directly connecting should be operable for a qualified buyer and supplier that wishes to use these tools. Since these features are integrated with the exchange software, transaction capabilities with the exchange should be within reach of the communications platform and available on the platform screens. Thus, after a collaboration session which is capable of being manually recorded, the parties can elect to transact a transaction. Thereby, the exchange adds a strong value added service to customers.

If a service agent is not available, a projected queue time must be given to self-collaborators who may choose not to wait but maintain the information for later discussion. The system is able to discern whether or not a service agent was engaged in the collaboration for billing. The intended consequences of which would be that direct party collaboration will be much cheaper than service agent assisted collaboration.

Figure 2:
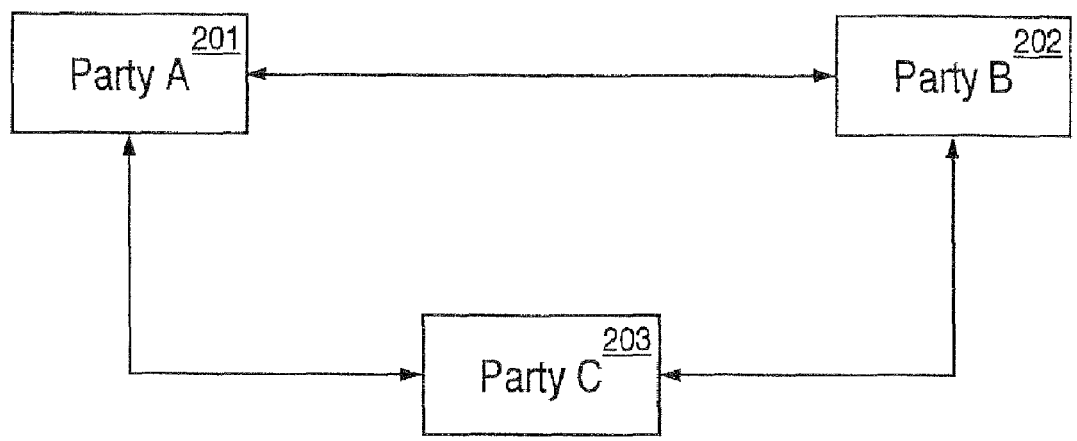
FIG. 2 shows an abstraction of a B2B partner arrangement in order to demonstrate the LCT methodology of the present invention.

FIG. 2 shows an abstraction of a B2B partner arrangement in order to demonstrate the LCT methodology of the present invention. Party A 201 could be a buyer. Party B 202 could be a supplier. Party C 203 is a service provider from either a separate company or from an organization belonging to either party A or from party B's organization (e.g., an internal service center). As an example, suppose Party A wants to buy a product from Party B through an intermediary, Party C. In this example, the Party C can be an eMarketplace. Using LCT methodology, Party A locates Party B using the locating technology described above and alternatively, instant messaging can be used. Assuming Party A reached party B, a collaboration session is established by launching a web application. This is done by providing a mutual RUL for the two parties to meet. All the while, the phone call is held active. A collaboration session then ensues between the buyer and supplier allowing both parties to talk and to perform web collaboration with the sharing of web pages. If Party A and B are then able to transact a deal on their own, they then complete their business with a transaction. The transaction software is made available for Party A or B to transact a B2B transaction.

The next step includes the above situation with the introduction of Party C. Party A and Party B collaborate towards making a transaction; however, they may use a third party service provided by Party C to assist with finalizing the transaction. Therefore, in this event, they are able to bring in Party C by clicking a "help" button. Party C will call into their current call and will be engaged on the system by Party A and Party B. Because the system application and domain of service is known to Party C, Party C will be able to make the transaction on behalf of Party A and Party B. It is understood that the integrated communication system allows Party C the capability to service Party A and Party B with the control and authority to transact.

In the current business paradigm, Party A and Party B would have to engage Party C on their own to complete a transaction. In that case, there would be no audit trail (e.g., call monitoring) of the agreement by Party A and Party B. Furthermore, video conferencing can be achieved as the preferred method or in addition to a web meeting as collaboration methodology between Party A, B, and C or in any combination assuming a simple computer video camera and software package are available at any of the two parties. It is also understood that the LCT methodology can be launched within an email message. The sequence from within an email message would involve triggering the same system to locate collaborate, and transact.

This LCT methodology is especially well demonstrated in common business scenarios, especially within a B2B exchange or eMarketplace. In the first scenario, Party A is a Planner-buyer trying to find if a commodity part is available or not. Party B is the supplier. Party C is a call center agent connected to both parties. Assuming that the Buyer-planner was able to locate the Supplier, the Buyer-planner then continues on to collaborate with the Supplier over the internet using web-collaboration software, internet video, data messaging, etc. Both parties during this collaboration stage determine if a transaction is possible. Once both parties have determined the final conditions for a purchase and/or sale, a transaction needs to be executed. If both parties have the ability to execute a transaction, then both will do so directly with each other. However, according to the LCT methodolgy, both parties have the option to bring in a third party (Party C) within an exchange setting to act on behalf of both Party A and B.

Figure 3:
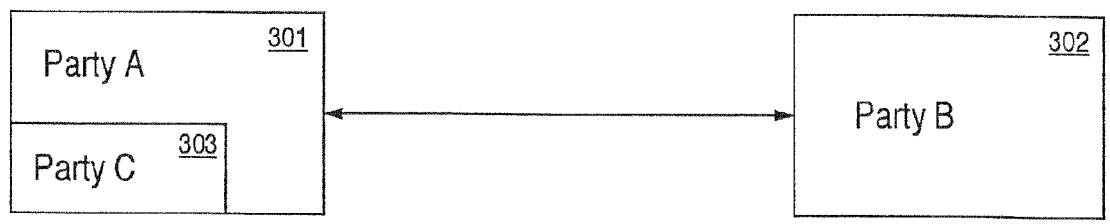
FIG. 3 shows another example related to a product design solution implementing the LCT methodology.

FIG. 3 shows another example related to a product design solution implementing the LCT methodology. For example, Party A 301 is a group of engineers from a customer and Party B 302 is the product design department from a Supplier need to collaborate together to make an engineering change order. Party C 303 might be a private eHub organization that is a subsidiary or belongs to the organization of Party A. Both parties can locate each other through a call center. Once doing so, both groups of people can collaborate with each other over the Internet using the features of web meeting collaboration. This web collaboration would empower the two parties to communicate engineering issues and design drawings over the Internet. Both parties can then easily connect into Party C, as an organization within Party A, by pushing a "help" button to draw in a Party C call center agent. Once both groups of people agree on the final engineering product designs, Party C can gather in all pertinent data in regards to the engineered product design purchase order, or help to make changes to the original order. Thus, within this scenario, the Party C call center agent still helps to not only facilitate the collaboration, but also execute a transaction between the two groups of engineers.

Figure 4:
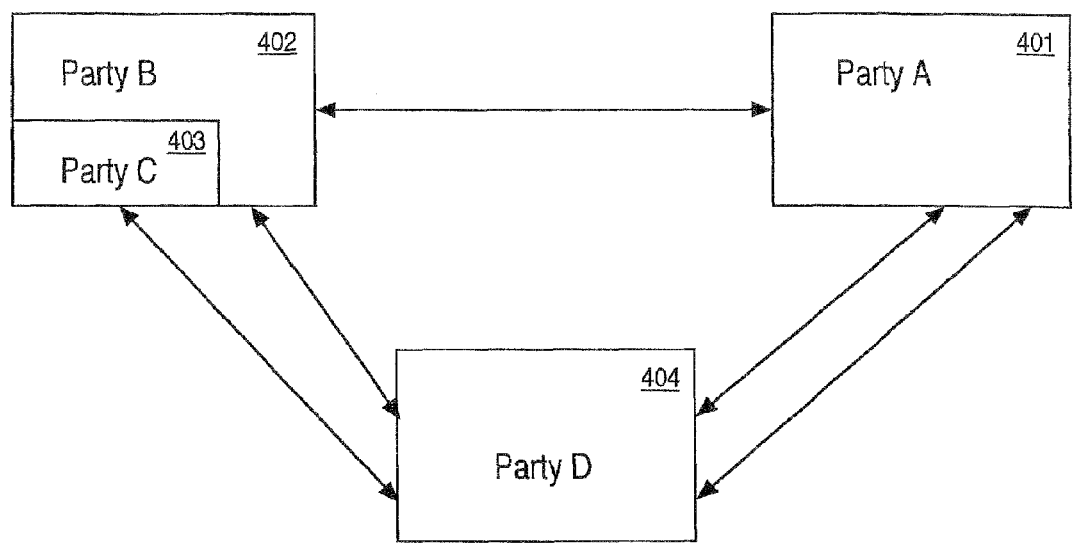
FIG. 4 shows an example of an exception handling solution using the LCT methodology of the present invention.

FIG. 4 shows an example of an exception handling solution using the LCT methodology of the present invention. Whereas the LCT methodology is seen in a scenario where buyers are seeking suppliers, the same methodology can be used sued within a multiple-partner business relationship to locate-collaborate-transact to other processes that are related to doing business between a buyer and supplier. In this example, party A 401 has received a defective shipment from supplier Party B 402 and they need to both work on exception handling issues related to their original transaction. Party C is a private eHub with transaction enabled call center agents within the organization of Party B. Party D 404 is an intermediary "public" eMarketplace exchange.

As shown in FIG. 4, the features of LCT allow business partners to manage all the exception handling related to a transaction. A transaction may not truly be finalized unless goods are shipped, payments are received, and material return authorizations resolved. In these necessary back-office functions, the LCT methodology of locating-collaborating-transacting can be applied. For example, Party A needs to contact Party B about a received shipment of bad material. Using the methods described in the patent applications referenced herein, an Internet collaborative session then ensures and Party B agrees to accept the returned material from Party A. Once the issue has been settled, Party B agrees to issue a Return Material Authorization (RMA) to nullify the original transaction. However, Party A still needs a shipment of goods from Party B. Therefore, Party B looks to its own private eHub, Party C, as a potential source. The goods Party A seeks is hard to find material, and is not even available within Party C's eHub. Since the material is still not available, all parties can still use the LCT methodology to also communicate with Party D, an outside public eMarketplace exchange for a collaborative communications session to find another source for the needed goods.

Once Party A is connected into Party D, and eMarketplace, suppliers within the exchange can be found with the matching order that Party A requires. Through additional Internet collaboration, all parties are able to see that Party D has the missing material available and Party C is enlisted to help make the transaction with Party D. Finally, Party A agrees to all the terms and conditions of the most recent transactions with Party B, Party C, and Party D because all collaborations were recorded in a safe, audit proof environment. Once the deal is transacted, Party D ships the needed material to Party A.

It should be noted that the LCT methodology is not limited to demand planning, engineering design and engineering change orders, and exception handling. It can also be applied to handling several other business needs such as handling requisitions, approval of purchasing orders, managing bulk orders, receiving goods, managing the distribution of shipments, and handling payments. It is also contemplated that the LCT methodology of the present invention extends to the general functions carried out by general practitioners of B2B intercommunication and procurement.

Thus, a LCT methodology has been disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus comprising:
   means for identifying a first party indicating a first preset transacting criteria;
   means for matching second preset transacting criteria to the first preset transacting criteria, the second preset transacting criteria corresponding to a second different party;
   means for determining if an automated machine-to-machine transaction is to be executed responsive to the matching, and if the automated machine-to-machine transaction is to be executed, immediately executing the automated machine-to-machine transaction based on the first and second preset transaction criteria;
   means for transferring Uniform Resource Locator (URL) information to the parties for establishing a web-collaboration session between the first and second parties responsive to identifying the parties when the automated machine-to-machine transaction is not executed, the web-collaboration session to be established without any call center agents initially included in the web-collaboration session;
   means for signaling a call center agent to join the web-collaboration session and facilitate manual transaction completion responsive to an invitation from one of the parties;
   means for recording negotiations that are transferred through the URL between the parties and that are for manually completing the transaction between the parties when the automated machine-to-machine transaction is not executed, the recorded negotiations including any communications from the parties and the call center agent;
   means for providing the recorded negotiations to one or both of the parties responsive to a record request from either party;
   means for monitoring packetized workflow procurement process communications exchanged between the parties to determine whether final receipts are sent to indicate consummation of the manually completed transaction, and when the manually completed transaction is not consummated, identify one or more exceptions responsible for disrupting consummation of the manually completed transaction;
   means for determining whether the identified exceptions are a first flagged type that occurs when a sending application involved in the web-based collaboration session does not receive a confirmation within a predetermined time period, a second flagged type that occurs when either one or more networks for the parties are unable to transfer one or more of the packetized workflow procurement process communications, or a third flagged type that occurs when the packetized workflow procurement process communications include an out of bounds security parameter;
   means for generating a notification when the identified exceptions are one of the flagged types;
   means for formatting the generated notification to indicate the determined flagged type; and
   means for sending an electronic communication to distribute the formatted notification, wherein the formatted notification is distributed according to the flagged type determination.

2. The apparatus of claim 1 further comprising:
   means for accessing a database that lists both potential distributees for the generated notification including agents corresponding to the parties and business information corresponding to the agents;
   means for generating, using the database and according to the business information, a ranked listing of the agents for intelligently distributing the generated notification; and
   means for distributing a notification to one or more of the agents intelligently according to the ranked listing to resolve the exceptions identified by monitoring the packetized workflow procurement process communications.

3. The apparatus of claim 1 further comprising means for providing video conferencing, web meeting, instant messaging, and internet collaboration for conducting the web collaboration session.

4. The apparatus of claim 3, wherein the internet collaboration includes means for page sharing, follow-me, form share, text chat, application demonstrations, application sharing, whiteboarding, and seek-and-find.

5. The apparatus of claim 1, further comprising means for remotely establishing a video communication session directly between the first party and the second party.

6. The apparatus of claim 1 further comprising:
   means for comparing the determined flag type to a database that lists both potential distributees for the generated notification including agents corresponding to the parties and business information corresponding to the agents, the comparison for ranking potential target agents for intelligent distribution of the generated notification; and
   means for distributing the generated notification according to the target agent ranking.

7. An apparatus, comprising:
   one or more processors; and
   a memory coupled to the processors comprising instructions executable by the processors, the processors operable when executing the instructions to:
   identify first transaction criteria corresponding to a first party;

analyze an exchange to identify second transaction criteria that matches with the first transaction criteria, the second transaction criteria corresponding to a second party;

send communications to both an endpoint corresponding to the first party and an endpoint corresponding to the second party, the communications including a mutual URL, the communications sent proactively and independently of any requests from one party identifying the other party;

establish a web-based collaboration session between the parties if both the endpoints launch web applications responsive to receiving the communications including the mutual URL, the web-based collaboration session established without any call center agents initially included in the web-based collaboration session;

after establishing the web-based collaboration session, provide current market information of a business deal to said first party and said second party through the web-based collaboration session;

transact said business deal between the first party and the second party through the web-based collaboration session without signaling for any of the call center agents to join the web-based collaboration session at any time between session establishment and deal transaction if no invitations are received; and responsive to receiving an invitation from one of the parties over the session, signal one of the call center agents to launch the web application and join the web-based collaboration session, after the call center agent joins, transact the deal between the first party and the second party;

monitor packetized workflow procurement process communications exchanged between the parties to determine whether final receipts are sent to indicate consummation of the transaction, and when the transaction is not consummated, identify one or more exceptions responsible for disrupting consummation of the transaction;

determine whether the identified exceptions are a first flagged type that occurs when a sending application involved in the web-based collaboration session does not receive a confirmation within a predetermined time period, a second flagged type that occurs when a network is unable to transfer one or more of the packetized workflow procurement process communications, or a third flagged type that occurs when the packetized workflow procurement process communications include an out of bounds security parameter;

generate a notification when the identified exceptions are one of the flagged types;

format the generated notification to indicate the determined flagged type; and send an electronic communication to distribute the formatted notification, wherein the formatted notification is distributed according to the flagged type determination.

8. The apparatus of claim 7, wherein the processors are further operable to determine whether an automated machine-to-machine transaction is to be completed responsive to the matching, and if the machine-to-machine transaction is to be completed, completing the automated machine-to-machine transaction based on the transaction criteria without manual involvement from the parties.

9. The apparatus of claim 7, wherein the processors are further operable to record communications sent by the parties through the web applications for providing an audit trail of the transacted business deal.

10. The apparatus of claim 7, wherein the processors are further operable to cause a same navigation target Uniform Resource Locator (URL) to be provided to the launched web applications to establish the web-based collaboration session between the parties.

11. The apparatus of claim 7, wherein the processors are further operable to remotely establish video conferencing, web meeting, instant messaging, and internet collaboration directly between the parties.

12. The apparatus of claim 11, wherein the internet collaboration includes page sharing, follow-me, form share, text chat, application demonstrations, application sharing, whiteboarding, and seek-and-find features.

13. The apparatus of claim 7, wherein the processors are further operable to:

establish video communication directly between the first party and the second party.

* * * * *